United States Patent
Pearce et al.

(10) Patent No.: US 10,840,696 B2
(45) Date of Patent: Nov. 17, 2020

(54) METHOD AND APPARATUS FOR LIMITING THE OUTPUT VOLTAGES OF SWITCH MODE POWER SUPPLIES

(71) Applicant: KOLLMORGEN CORPORATION, Radford, VA (US)

(72) Inventors: Robert Pearce, Bristol (GB); George B. Yundt, Andover, MA (US); Lee Gray, Sterling, MA (US)

(73) Assignee: KOLLMORGEN CORPORATION, Radford, VA (US)

( * ) Notice: Subject to any disclaimer, the term of this patent is extended or adjusted under 35 U.S.C. 154(b) by 75 days.

(21) Appl. No.: 16/247,478

(22) Filed: Jan. 14, 2019

(65) Prior Publication Data

US 2020/0227910 A1    Jul. 16, 2020

(51) Int. Cl.
*H02M 3/335* (2006.01)
*H02H 7/12* (2006.01)

(52) U.S. Cl.
CPC ...... *H02H 7/1213* (2013.01); *H02M 3/33523* (2013.01)

(58) Field of Classification Search
CPC .......... H02M 1/32; H02M 1/40; H02M 7/217; H02M 3/33523; H02M 3/33592; H02M 3/33507; H02M 3/33561; H02M 3/33538; H02M 3/185; H02M 3/335
See application file for complete search history.

(56) References Cited

U.S. PATENT DOCUMENTS

| | | | | |
|---|---|---|---|---|
| 4,234,967 A | * | 11/1980 | Henschel | G08C 23/04 307/10.7 |
| 4,318,165 A | * | 3/1982 | Kornrumpf | H02M 3/33507 219/761 |
| 4,447,841 A | * | 5/1984 | Kent | H02M 3/33561 361/18 |
| 4,464,709 A | | 8/1984 | Barter | |
| 4,969,077 A | * | 11/1990 | Plagge | H02J 7/022 320/164 |

(Continued)

FOREIGN PATENT DOCUMENTS

DE   10221710 A1   11/2003
EP   2110938 B1   8/2018
(Continued)

*Primary Examiner* — Thienvu V Tran
*Assistant Examiner* — Nusrat Quddus
(74) *Attorney, Agent, or Firm* — Day Pitney LLP

(57) ABSTRACT

An over-voltage comparator and shutdown circuit for a power converter, comprising at least a first voltage divider connected between ground and a monitored voltage, the voltage divider including a first resistor and a second resistor, a switch mode regulator connected to a primary switch of the power converter, and a first threshold comparator, wherein a monitored input of the first threshold comparator is connected between the first resistor and the second resistor, an anode of the first threshold comparator is connected to ground, and a cathode of the first threshold comparator is connected to the switch mode regulator, and wherein the monitored voltage is voltage at an end of a primary winding of the power converter. An auxiliary output circuit of the power converter may be provided having a first output providing the monitored voltage and a second output providing power to the switch mode regulator.

13 Claims, 3 Drawing Sheets

(56) References Cited

U.S. PATENT DOCUMENTS

| | | | | |
|---|---|---|---|---|
| 5,032,967 | A | * | 7/1991 | Marinus .................. H02M 1/40 |
| | | | | 363/21.13 |
| 5,621,623 | A | * | 4/1997 | Kuriyama ......... H02M 3/33538 |
| | | | | 363/20 |
| 5,627,437 | A | * | 5/1997 | Kim ....................... H04N 3/185 |
| | | | | 315/399 |
| 8,687,394 | B2 | | 4/2014 | Cottingham et al. |
| 9,559,597 | B2 | | 1/2017 | Malinin et al. |
| 2007/0133236 | A1 | * | 6/2007 | Usui ....................... H02M 1/32 |
| | | | | 363/56.01 |
| 2010/0182808 | A1 | * | 7/2010 | Sato .................. H02M 3/33592 |
| | | | | 363/21.18 |
| 2014/0204619 | A1 | * | 7/2014 | Telefus ............. H02M 3/33523 |
| | | | | 363/21.01 |
| 2015/0236613 | A1 | * | 8/2015 | Neyman ............... H02M 7/217 |
| | | | | 363/89 |
| 2016/0270185 | A1 | * | 9/2016 | Zhang ................ H05B 33/0887 |

FOREIGN PATENT DOCUMENTS

| | | | |
|---|---|---|---|
| GB | 2198558 | A | 6/1988 |
| JP | 2015133857 | A | 7/2015 |
| KR | 1999-0079539 | A | 11/1999 |
| TW | 201332265 | A | 8/2013 |

* cited by examiner

| Input Voltage | Max. Permitted V primary OFF (55V-input voltage) | Max. VOUT1 | Max. VOUT2 |
|---|---|---|---|
| 15.0 | 40.0 | 9.5 | 29.5 |
| 20.0 | 35.0 | 8.3 | 25.8 |
| 24.0 | 31.0 | 7.3 | 22.8 |
| 30.0 | 25.0 | 5.8 | 18.3 |
| 33.0 | 22.0 | 5.0 | 16.0 |
| 40.0 | 15.0 | 3.3 | 10.8 |
| 45.0 | 10.0 | 2.0 | 7.0 |
| 53.0 | 2.0 | 0.0 | 1.0 |
| 60.0 | 0.0 | 0.0 | 0.0 |

METHOD AND APPARATUS FOR LIMITING THE OUTPUT VOLTAGES OF SWITCH MODE POWER SUPPLIES

FIELD OF THE INVENTION

The present invention is directed toward a switch mode power supply that supplies high integrity electronic control circuits. Such circuits are used in the electronic controls for motor driven shafts found in automated machinery and other electrically-driven equipment, and more generally are found in systems offering functional safety in the fields of avionics, transportation, medical equipment, automation and process control, amongst others.

BACKGROUND

Machinery manufactured and operated globally in all industries is subject to safety requirements and standards. For example, machinery manufactured in the European Union is required to demonstrate safety against injury by the application of standards set forth by the International Electrotechnical Commission and the International Organization for Standardization, including but not limited to IEC 61508 (methods on application, design, deployment, and maintenance of automatic protection systems), IEC62061 (functional safety of electrical, electronic and programmable electronic control systems), and ISO13849 (safety-related design principles of employed control systems). Compliance with functional safety standards is required in numerous business sectors, including the electronic controls of vehicles, process control systems for chemical plants, and medical equipment, amongst others.

Amongst required safety standards are required safety integrity levels ("SIL"), which relates to the probability of a safety control system or sub-system satisfactorily performing the required safety-related control functions under all stated conditions. IEC62061 defines three levels of SIL; SIL1 which has a probability of dangerous failure per hour, termed $PFH_D$, in the range $\geq 10^{-6}$ to $<10^{-5}$, SIL2 which has a $PFH_D$ in the range $\geq 10^{-7}$ to $<10^{-6}$ and SIL3 which has a $PFH_D$ in the range $\geq 10^{-8}$ to $<10^{-7}$ and is the most stringent. In addition to these $PFH_D$ requirements, each SIL also has "architectural requirements" as set out in table 5 of IEC62061.

ISO13849 defines performance levels C, D and E with are broadly equivalent to SIL1 SIL2 and SIL3 respectively; the performance levels have "designated architectures" that are categories 2, 3 and 4. Category 3 requires "continued performance of the safety function in the presence of a single fault" whereas category 4 requires "continued performance of the safety function in the presence of a single fault . . . the accumulation of undetected faults is taken into account . . . consideration of a fault combination of two faults may be sufficient".

These safety requirements apply not just to the control circuits but also to their power supplies. If a power supply fails, then the failure must result in a predictable output voltage so that the control circuit can be protected from excess voltages and fail to a known, safe state, the safe state being between a maximum safe possible voltage for the control circuits and zero.

DESCRIPTION OF RELATED ART

Forms of power supplies are known in the art in connection with various technical fields. However, prior systems require sizing of current and voltage and require inconvenient or additional actions to regulate output.

Korean Patent Publication No. KR1999-0079539 teaches a power supply which maintains a secondary side voltage constant according to the change of the winding ratio.

Taiwan Patent Publication No. TW201332265 teaches a power supply with a detection circuit that detects auxiliary voltage to limit the power source and reduce consumption.

German Patent Publication No. DE10221710 teaches a switched-mode power supply comprising a secondary winding in a wired up mode to compensate for and stabilize power from the primary winding.

UK Patent Publication No. GB2198558 teaches a constant voltage network including a secondary winding and a multi-output power supply to stabilize output voltage.

U.S. Pat. No. 9,559,597 teaches a power converter configured to detect an open connection fault and supply current to the auxiliary winding, and upon detecting an increase in the voltage across the auxiliary winding, disabling the power converter.

U.S. Pat. No. 4,464,709 teaches a power supply switching circuit for controlling DC power between a switching circuit and a voltage protection circuit.

Japanese Patent Publication No. JP 2015-133857 teaches a drive circuit for supplying constant voltage to a primary winding and where the coupling degree between a primary winding and secondary winding is determined by magnetic gap.

U.S. Pat. No. 8,687,394 teaches a closed-loop DC power output that can short turns of primary windings to control the turns ratio in the transformer and compensate for decreases in the DC power output.

European Patent No. EP2110938 teaches a power supply that switches current based on flow time of current through a secondary side winding to regulate the output voltage of the switching power supply.

Although the prior art generally relates to the field of power supplies and regulation of current, none teaches a power supply for powering high integrity control circuits comprising a feedback control circuit that achieves closed loop regulation of the output voltage coupled to the principal secondary winding and an over-voltage detector circuit that shuts down the switch mode regulator sub-circuit upon detecting over-voltage and thereby limits the maximum output voltages of the supply. In addition, none of the prior art uses the sum of the supply voltage and the output voltage reflected back to the primary winding as the signal that is to be monitored.

SUMMARY OF THE INVENTION

A first embodiment of the disclosed invention comprises an over-voltage comparator and shutdown circuit for a power converter, comprising a first voltage divider connected between ground and a monitored voltage, the voltage divider including a first resistor and a second resistor, a switch mode regulator connected to a primary switch of the power converter, and a first threshold comparator, a monitored input of the first threshold comparator connected between the first resistor and the second resistor, an anode of the first threshold comparator connected to ground, and a cathode of the first threshold comparator connected to the switch mode regulator, wherein the monitored voltage is voltage at an end of a primary winding of the power converter.

A second embodiment of the disclosed invention comprises an over-voltage comparator and shutdown circuit for a power converter comprising a first voltage divider connected between ground and a monitored voltage, the voltage divider including a first resistor and a second resistor, a switch mode regulator connected to a primary switch of the power converter, a first threshold comparator, a monitored input of the first threshold comparator connected between the first resistor and the second resistor, an anode of the first threshold comparator connected to ground, and a cathode of the first threshold comparator connected to the switch mode regulator, a second voltage divider connected between ground and a monitored voltage, the voltage divider including a third resistor and a fourth resistor, and a second threshold comparator, a monitored input of the second threshold comparator connected between the third resistor and the fourth resistor, an anode of the second threshold comparator connected to ground and a cathode of the second threshold comparator connected to the switch mode regulator, wherein the monitored voltage is voltage at an end of the primary winding of the power converter.

A third embodiment of the disclosed invention comprises an over-voltage comparator and shutdown circuit for a power converter comprising a first voltage divider connected between ground and a monitored voltage, the voltage divider including a first resistor and a second resistor, a switch mode regulator connected to a primary switch of the power converter, a first threshold comparator, a monitored input of the first threshold comparator connected between the first resistor and the second resistor, an anode of the first threshold comparator connected to ground, and a cathode of the first threshold comparator connected to the switch mode regulator, and an auxiliary output circuit of the power converter having a first output and a second output, the first output of the auxiliary output circuit providing the monitored voltage and the second output of the auxiliary output circuit providing power to the switch mode regulator.

DETAILED DESCRIPTION OF THE DRAWINGS

Figure 1:
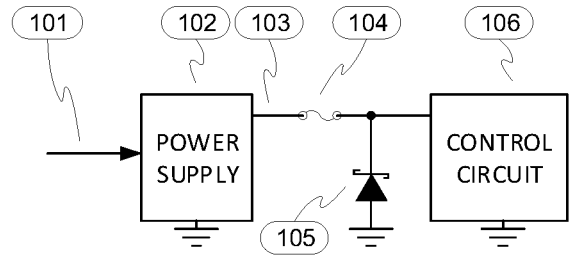
FIG. 1 is a prior art power supply with over-voltage protection at its output feeding a control circuit.

As seen in the prior art protection scheme shown in FIG. 1, an incoming source of power 101 feeds a power supply 102. In industrial systems, the source of power 101 is typically an external protected extra-low voltage source ("PELV") which supplies a +24V power supply. The output 103 of the power supply 102, for example +5V, is taken through a fuse 104 to the control circuit 106. The input of the control circuit 106 is shunted by over-voltage protection device such as a transient-voltage-suppression ("TVS") diode 105. In the event that the power supply fails to a high voltage on the output 103 the TVS diode 105 will draw enough current to clear the fuse 104 and so protect the control circuit 106. De-energization of the control circuit 106 is considered to be a safe state.

The prior art protection scheme shown in FIG. 1 is accepted good practice but its operation relies on the correct sizing of the fuse 104 and TVS diode 105. Fuses have both current and voltage ratings. Therefore fuse 104 can only be correctly sized if the voltage of output 103 of power supply 102 is known for all its fault conditions, including an accumulation of faults if category 4 performance is required.

If the power supply 102 is a linear regulator or an un-isolated buck regulator, then in a fault condition, the voltage of output 103 cannot exceed the input voltage of source of power 101. If the power supply is an isolated buck regulator, then in a fault condition the output voltage cannot exceed the input voltage multiplied the turns ratio of the internal transformer, not illustrated, of the isolated buck regulator. In all these cases the value of the voltage of output 103 in a fault condition is predictable and the fuse 104 can be appropriately rated.

However linear regulators are seldom used except at the very lowest power levels and where isolation is not required. An isolated buck regulator provides both isolation and a predictable voltage in a fault condition but it is uneconomic and physically too large to use at power levels less than about 50 W. At less than 50 W, the preferred power supply topology is the fly-back converter because it is compact, low cost, and suitable for supplying multiple, isolated output voltages. The fly-back converter is therefore the power supply of choice for a wide range of control circuits. Of course, other power supplies are known in the art. An objection to the use of a fly-back regulator as the basis of the power supply 102 is that, in a fault condition, the voltage of output 103 cannot be predicted and therefore that the fuse 104 and TVS diode 105 cannot be correctly sized.

Figure 2:
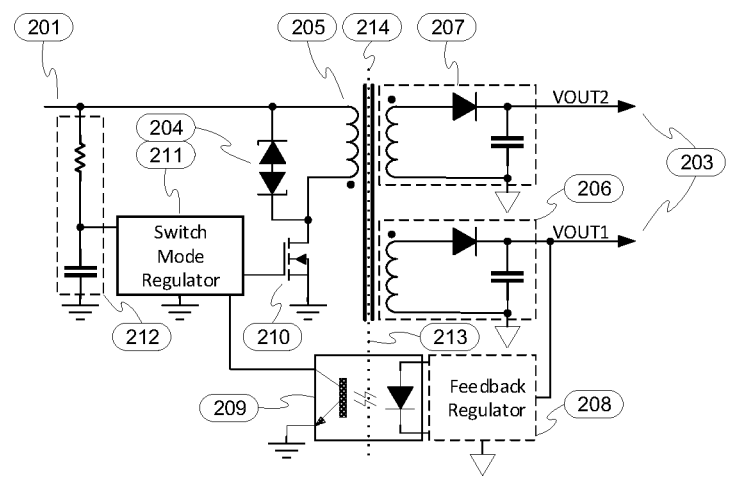
FIG. 2 is a prior art power supply based on the fly-back topology for low input voltage.

FIG. 2 shows a prior art example fly-back regulator that is typical of the prior art, particularly for low power equipment derived from a PELV supply voltage of 24V DC. The incoming DC power rail 201 is connected to the primary winding 205 of the coupled inductor 214. The incoming voltage from DC power rail 201 is applied to the primary winding 205 of the coupled inductor 214 when the primary switch 210 is on. Switch mode power supply regulator sub-circuit 211 supplies a pulse-width modulated ("PWM") pulse train to the gate of the primary switch 210 thus turning the primary switch 210 on and off and therefore varies the energy supplied to the loads at each switching cycle. In this example power supply, there are two output rails 203 respectively referenced as VOUT1 and VOUT2, though it is envisioned within the present invention that one, two, or more output rails could be provided. The first output rail, VOUT1, from the principal output sub-circuit 206, is preferably closed-loop regulated. The second output rail, VOUT2, from the subsidiary output sub-circuit 207, is preferably transformer regulated in that it follows the output of principal output sub-circuit 206 in proportion to the turns ratio of the two secondary windings. This circuit could be extended to have any number of subsidiary output sub-circuits, and any number of output rails could be provided. Closed loop feedback of the principal output sub-circuit 206 occurs via the path, including feedback sub-circuit 208, opto-isolator 209, and switch mode power supply regulator sub-circuit 211, which varies the PWM pulse train to the gate of the primary switch 210. A typical feedback sub-circuit 208 is based on an adjustable shunt regulator, such as the TL431 from Texas Instruments. An over-voltage suppressor such as a TVS diode 204 limits the voltage stress on the primary switch 210 at turn-off. The switch mode power supply regulator sub-circuit 211 may require 10 mA at approximately 10V to operate, and therefore an auxiliary power supply 212 (such as a dropper resistor) for the switch mode power supply regulator sub-circuit 211 is needed. The output rails 203 are isolated from all potentials relating to the DC power rail 201, and the isolation barrier 213 is formed by the primary winding 205 of the coupled inductor 214 and the opto-isolator 209.

The fly-back converter works on the principle that energy is built up in the coupled inductor 214 when the primary switch 210 is on and is transferred to the principal output sub-circuit 206 and subsidiary output sub-circuit 207 when the primary switch 210 is off. In normal operation, the pulse width in the PWM control signal applied the primary switch 210 is continually adjusted so that the principal output VOUT1 is held almost constant at the desired value. Under steady state conditions, the pulse width is exactly long enough so that the energy supplied to the coupled inductor 214 when primary switch 210 is ON exactly balances the energy extracted from the coupled inductor 214 when primary switch 210 is OFF, and the majority of this energy is supplied to the loads (not illustrated), through the output rails 203 that are called VOUT1 and VOUT2.

In a fault condition the switch mode power supply regulator sub-circuit 211 may malfunction and emit a PWM pulse train that is of fixed duty cycle, such as 50%. Under these circumstances, there is a loss of equilibrium and the output rails 203 (VOUT1 and VOUT2) will rise until equilibrium is re-established. If the loads are resistive, then it is possible to predict what the output voltage will be, even in this fault condition, but in practice the loads will be variable and such a prediction cannot be made. The problem therefore is to ensure that in a fault condition the fly-back regulator supplies output voltages do not exceed predicted voltage limits and therefore it is possible to correctly size other protective measures such as TVS diode 105 and fuse 104.

The invention uses the voltage reflected back from the output to a winding referenced to the primary side of the power supply as an indicator of the output voltage. When this voltage indication exceeds a pre-determined limit then the power supply is shut down.

Figure 3:
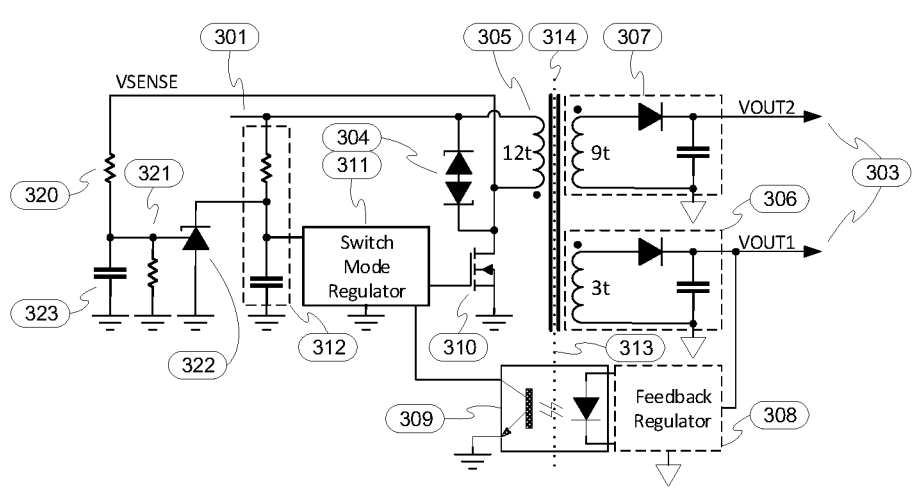
FIG. 3 is a first embodiment of the present invention, showing a fly-back power supply for low input voltage with an output voltage limiter circuit.

FIG. 3 shows the first preferred embodiment of the invention, which is an elaboration and improvement on the prior art power supply of FIG. 2. The reference numerals of FIG. 3 in the range 301 to 314 correspond to the identical elements as reference numerals of FIG. 2 in the range 201 to 214 and therefore will not be described again. The signal at the end of the primary winding 305 that is connected to the primary switch 310 is referred to as VSENSE, and this signal is also led to an over-voltage comparator and shutdown circuit comprising elements upper resistor 320, lower resistor 321, adjustable shunt regulator 322, and filter capacitor 323. Adjustable shunt regulator 322, which can be a type TL431 made by Texas Instruments, is a three-terminal device that allows current to flow from the cathode terminal (the uppermost terminal in FIG. 3) to the anode terminal (the lowermost terminal in FIG. 3) when the reference input ("REF") (on the left in FIG. 3) exceeds an internally created monitored voltage, such as 2.5V. The adjustable shunt regulator 322 fulfils the function of a threshold comparator, which is also envisioned within the scope of the present invention. A resistor divider comprises an upper resistor 320 and a lower resistor 321, the junction of these two resistors is presented to the reference input of the adjustable shunt regulator 322. A capacitor shunts the lower resistor 321 and thereby filters the signal presented to the REF input of the adjustable shunt regulator 322. This filtering is required to reject false triggering when the leakage inductance is being clamped by a turn-off over-voltage suppressor sub-circuit 304 such as a TVS diode.

Referring to FIG. 3 the voltage at signal VSENSE at which over-voltage comparator and shutdown circuit takes effect is defined as the adjustable shunt regulator 322 times the total of the upper resistor 320 plus the lower resistor 321 divided by the lower resistor 321. Using example values, this may equal $\{2.5V\} \times [\{525\ k\Omega + 25\ k\Omega\}/25\ k\Omega] = \{2.5V\} \times [550\ k\Omega/25\ k\Omega] = 55V$.

An example of the operation of the over-voltage comparator and shutdown circuit comprising elements upper resistor 320, lower resistor 321, adjustable shunt regulator 322, and filter capacitor 323 is provided. The supply voltage is nominally +24V with an operating range of +20V to +30V, but the supply voltage may vary safely over the wider range of +15V to +60V. The principal output sub-circuit 306 generates one of two output rails 303 (VOUT1) that is closed-loop regulated to +5V. The subsidiary output sub-circuit 307 generates a second of two output rails 303 (VOUT2) that is transformer regulated +16V. The number of turns for each winding is as shown in FIG. 3. The diode forward voltage drop in the principal output sub-circuit 306 and subsidiary output sub-circuit 307 is 0.5V. The upper resistor 320 is 525 kΩ and the lower resistor 321 is 25 kΩ, thereby resulting in a limiter threshold of 55V.

When the primary switch 310 is OFF, then the voltage across the primary winding 305 is equal to the total of the output voltage plus the forward voltage drop times the total of the number of primary turns divided by the number of secondary turns. Using the values above, this may appear as $(5V+0.5V) \times (12t)/(3t) = 22V$.

Signal VSENSE is therefore 22V higher the incoming supply rail 301. Under nominal conditions, the incoming supply rail 301 is +24V and therefore signal VSENSE is 22V+24V=46V above its respective ground rail. This analysis also holds good for the other output rail VOUT2 when taking into account the different number of turns and output voltage.

With a limiter threshold of 55V in force and an input voltage of the supply rail 301 of 24V, the secondary voltage that is reflected to the primary winding in the OFF state cannot exceed (55V−24V)=31V. In this example, the 31V× 3t/12t=7.75V is all that is permitted on the 5V output before the limiter shuts down the supply (or 7.25V allowing for 0.5V of diode drop). The possible combinations of input voltage and output voltage are tabulated in FIG. 4.

Figures 4, 5:
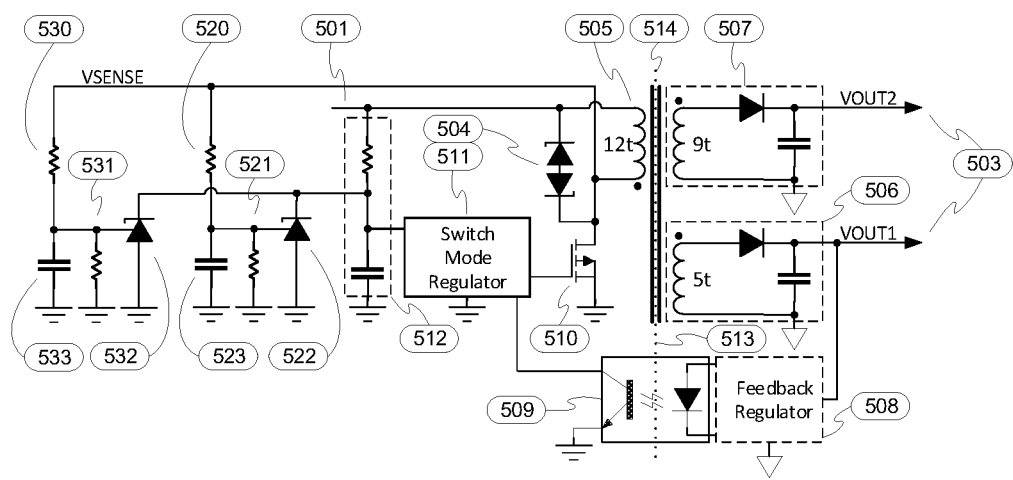
FIG. 4 is a table showing the protective behavior of the voltage limiter circuit as it varies with input voltage of the first embodiment seen in FIG. 3.
FIG. 5 is a variant of the fly-back power supply with two voltage limiter circuits seen in FIG. 3.

Referring to the table of FIG. 4 as examples, when the input rail is at +15V, the +5V output VOUT1 will cause the supply to shut down if it exceeds 9.5V. At higher input voltages, the margin for a faulty output is tighter, and at an voltage of +30V on the supply rail 301, the output rail VOUT1 will cause the supply to shut down if it exceeds 5.8V. The nominally +16V output VOUT2 is constrained to 18.3V when the input voltage is +30V. With +33V or more at the input, the power supply will shut down, which constrains the maximum output voltage, and the shutdown circuit comprising elements upper resistor 320, lower resistor 321, adjustable shunt regulator 322, and filter capacitor 323 serves the second purpose of being an input over-voltage lock-out circuit. Of course, other input rail voltages not provided in the chart are envisioned within the scope of the invention.

An alternative single-fault condition that must be considered is for the diode in the principal output sub-circuit 306 to fail to open-circuit. The feedback sub-circuit 308 will attempt to compensate for this by driving the PWM of the switch mode power supply regulator sub-circuit 311 to its maximum duty cycle. This in turn will cause the subsidiary output sub-circuit 307 to drive VOUT2 upwards. However referring to the table of FIG. 4, it can be seen that with the nominal +24V at the input, the subsidiary output VOUT2, nominally +16V, is limited to +22.8V.

If the control circuit is designed to offer category 4 performance according to ISO13849, for example, then it is necessary to consider what happens when two independent faults occur. The first fault is switch mode power supply regulator sub-circuit 311 driving the PWM to its maximum duty cycle. A second independent fault could be the failure to open-circuit of the cathode of the adjustable shunt regulator 322. To operate safely in the presence of this second fault, the circuit of FIG. 3 can be elaborated to that of the second preferred embodiment shown in FIG. 5 wherein a second limiter circuit has been added comprising elements second upper resistor 530, second lower resistor 531, second adjustable shunt regulator 532, and second filter capacitor 533. All other reference numerals in FIG. 5 in the range 501 to 523 correspond to the identical elements as reference numerals of FIG. 3 in the range 301 to 323 and therefore will not be described again. The operation of the second limiter circuit is identical to that of the first voltage limiting shutdown circuit comprising elements upper resistor 320, lower resistor 321, adjustable shunt regulator 322, and filter capacitor 323 described in conjunction with FIG. 3. The two limiter circuits are joined together at the cathodes of the adjustable shunt regulators 522 and 532, which is a wired-OR type connection, and either limiter can shut down the switch mode power supply regulator sub-circuit 511.

The output of the second limiter circuit comprising elements second upper resistor 530, second lower resistor 531, second adjustable shunt regulator 532, and second filter capacitor 533 could alternatively be coupled to the gate of the MOSFET 510 in order to provide an alternative, independent shut down path. In the language of functional safety this change is said to increase diversity and to reduce common cause failure, both of which are beneficial.

Referring back to the table of FIG. 4, it will be seen that outputs VOUT1 and VOUT2 do not exceed 30V in a fault condition. This allows fuses rated for 60V DC to be connected in series with the outputs.

As shown above, the voltage limiting shutdown circuit comprising elements upper resistor 320, lower resistor 321, adjustable shunt regulator 322, and filter capacitor 323 not only limits all output voltages but is also an input overvoltage lock-out circuit, which provides significant functionality not provided in prior art systems.

The first preferred embodiment of the invention of FIG. 3, FIG. 4 and FIG. 5 is best suited to systems powered from low voltages, including battery powered apparatus and PELV powered apparatus. If the DC input voltage is derived from rectified AC mains, then the input voltage will preferably be in the order of hundreds of volts, that is at least ten times larger than the output voltage to the control circuit, and the technique of sensing the sum of the input voltage and the voltage reflected at the primary winding that is used in the first preferred embodiment is no longer of practical use. The prior art switching power supply of FIG. 2 is typical of low input voltages, however when the incoming DC power rail 201 is on the order of hundreds of volts it is not practical to power the switch mode power supply regulator sub-circuit 211 solely using a resistive dropper (or other linear regulator) as shown in the auxiliary power supply 212. Instead, the operating current is provided by a further winding.

Figure 6:
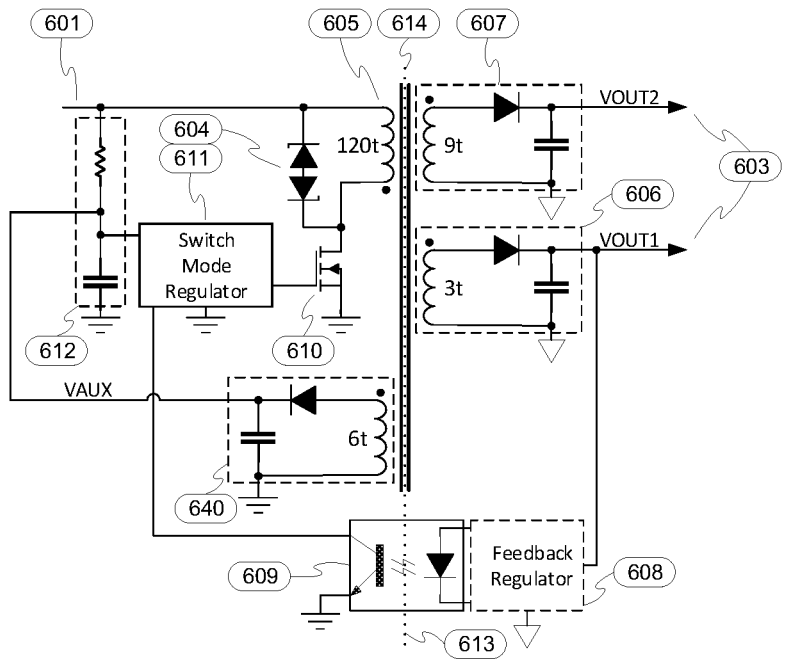
FIG. 6 is a prior art power supply based on the fly-back topology for high input voltage.

FIG. 6 shows a prior art example power supply based on the fly-back topology for a high input voltage. At start-up, the resistive dropper auxiliary power supply 612 powers the switch mode power supply regulator sub-circuit 611, however when the switching supply is operational, the auxiliary supply is derived from the auxiliary output sub-circuit 640. There are many switching power supply regulator ICs that are designed to operate in this manner, such as the UC3842 from Texas Instruments. All other reference numerals in FIG. 6 in the range 601 to 614 correspond to the identical elements as reference numerals of FIG. 2 in the range 201 to 214 and therefore will not be described again.

Figure 7:
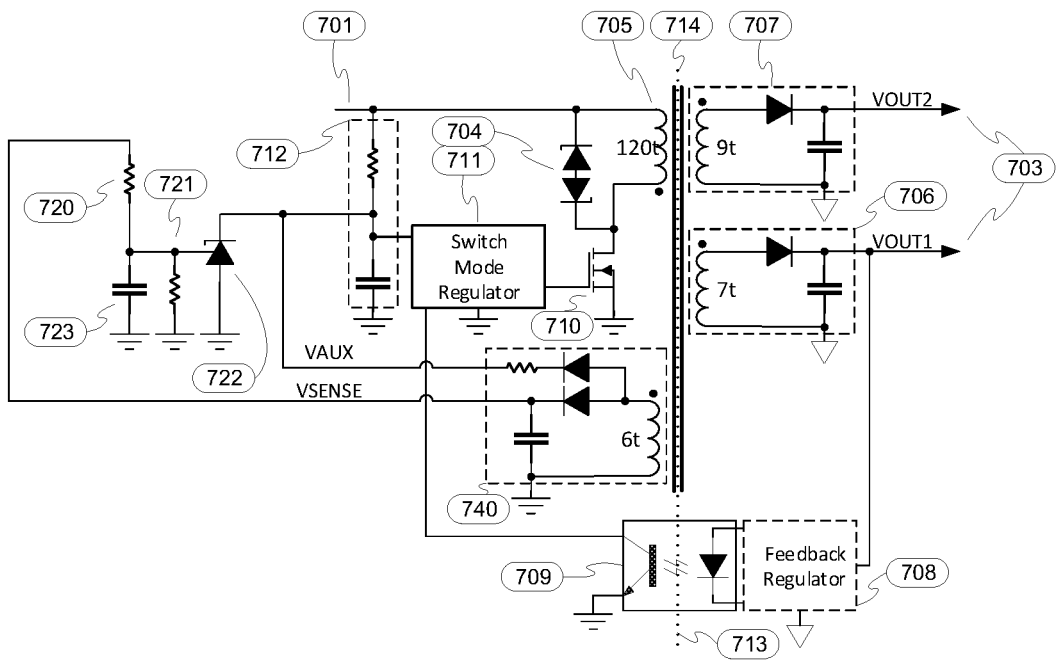
FIG. 7 is a second embodiment of the present invention, showing a fly-back power supply for high input voltage with an output voltage limiter circuit.

FIG. 7 is a third preferred embodiment of the present invention, which shows the prior art example power supply of FIG. 6 adapted to incorporate a voltage limiting shutdown circuit comprising elements upper resistor 720, lower resistor 721, adjustable shunt regulator 722, and filter capacitor 723. The auxiliary output sub-circuit 740 is modified to have two outputs, VAUX which powers the switch mode power supply regulator sub-circuit 711, and VSENSE which is monitored by the voltage limiting shutdown circuit comprising elements upper resistor 720, lower resistor 721, adjustable shunt regulator 722, and filter capacitor 723, the operation whereof is exactly the same as the shutdown circuit comprising elements upper resistor 320, lower resistor 321, adjustable shunt regulator 322, and filter capacitor 323 in the first preferred embodiment and will not therefore be repeated. All other reference numerals in FIG. 7 in the range 701 to 723 correspond to the identical elements as reference numerals of FIG. 3 in the range 301 to 323 and therefore will not be described again.

An important difference between the first preferred embodiment of FIG. 3 and the second preferred embodiment of FIG. 7 is that the first preferred embodiment uses the sum of the supply voltage and the output voltage reflected back to the primary winding as the signal VSENSE that is to be monitored whereas the second preferred embodiment derives signal VSENSE from the output voltage reflected onto the winding in the auxiliary output sub-circuit 740. In the second preferred embodiment, VSENSE does not depend upon the voltage of input supply rail 701 but simply tracks the output voltages VOUT1 and VOUT2 by transformer action. The second preferred embodiment therefore allows tighter limitation of the output voltages than does the first preferred embodiment, but unlike the first preferred embodiment, it does not also implement an input overvoltage lock-out. In both embodiments the voltage limiting shutdown circuit can be realized using two resistors, a capacitor and an adjustable shunt regulator, but the second preferred embodiment requires a further diode and capacitor found in the auxiliary output sub-circuit 740. Both preferred embodiments ideally protect all outputs, and both embodiments use a winding that is already present on the coupled inductor 314 or 714. Preferably, both preferred embodiments can incorporate a second voltage limiting shutdown circuit if safe behavior is required in the presence of two independent faults.

It will be understood by those of ordinary skill in the art that various changes may be made and equivalents may be substituted for element without departing form the scope of the invention. In addition, many modifications may be made to adapt a particular feature of material to the teachings of the invention without departing from the scope thereof. Therefore, it is intended that the invention not be limited to the particular embodiments disclosed, but that the invention will include all embodiments falling within the scope of the claims.

What is claimed:

1. An over-voltage comparator and shutdown circuit for a power converter, comprising:
   a first voltage divider connected between ground and a monitored voltage, the voltage divider including a first resistor and a second resistor;
   a switch mode regulator connected to a primary switch of the power converter;
   a first threshold comparator, a monitored input of the first threshold comparator connected between the first resistor and the second resistor, an anode of the first threshold comparator connected to ground, and a cathode of the first threshold comparator connected to the switch mode regulator;
   a second voltage divider connected between ground and a monitored voltage, the voltage divider including a third resistor and a fourth resistor; and
   a second threshold comparator, a monitored input of the second threshold comparator connected between the third resistor and the fourth resistor, an anode of the second threshold comparator connected to ground and a cathode of the second threshold comparator connected to the switch mode regulator;
   wherein the monitored voltage is voltage at an end of the primary winding of the power converter.

2. An over-voltage comparator and shutdown circuit according to claim 1, wherein the first resistor, the second resistor and the first threshold comparator provide a power input over-voltage lockout.

3. The over-voltage comparator and shutdown circuit according to claim 1, further comprising:
   a first capacitor connected in parallel with the second resistor, the first capacitor filtering voltage to the monitored input of the first threshold comparator; and
   a second capacitor connected in parallel with the fourth resistor, the second capacitor filtering voltage to the monitored input of the second threshold comparator.

4. The over-voltage comparator and shutdown circuit according to claim 3, wherein the first capacitor is configured to prevent false triggering of the first threshold comparator and the second capacitor is configured to prevent false triggering of the second threshold comparator.

5. An over-voltage comparator and shutdown circuit according to claim 1, wherein the third resistor, the fourth resistor and the second threshold comparator provide a power input over-voltage lockout.

6. The over-voltage comparator and shutdown circuit according to claim 1, wherein the shutdown circuit is configured to remove power from the switch mode regulator upon detection of an over-voltage condition.

7. The over-voltage comparator and shutdown circuit according to claim 1, wherein a power converter with the over-voltage comparator and shutdown circuit distinct from the switch mode regulator limits the power supply output in the presence of two faults within the power converter.

8. An over-voltage comparator and shutdown circuit for a power converter, comprising:
   a first voltage divider connected between ground and a monitored voltage, the voltage divider including a first resistor and a second resistor;
   a switch mode regulator connected to a primary switch of the power converter;
   a first threshold comparator, a monitored input of the first threshold comparator connected between the first resistor and the second resistor, an anode of the first threshold comparator connected to ground, and a cathode of the first threshold comparator connected to the switch mode regulator;
   an auxiliary output circuit of the power converter having a first output and a second output from an auxiliary coil, the first output of the auxiliary output circuit providing the monitored voltage and the second output of the auxiliary output circuit providing power to the switch mode regulator;
   a second voltage divider connected between ground and a monitored voltage, the voltage divider including a third resistor and a fourth resistor; and
   a second threshold comparator, a monitored input of the second threshold comparator connected between the third resistor and the fourth resistor, an anode of the second threshold comparator connected to ground and a cathode of the second threshold comparator connected to the switch mode regulator.

9. An over-voltage comparator and shutdown circuit according to claim 8, further comprising a first capacitor connected in parallel with the second resistor, the first capacitor filtering voltage to the monitored input of the first threshold comparator.

10. The over-voltage comparator and shutdown circuit according to claim 9, wherein the first capacitor is configured to prevent false triggering of the first threshold comparator.

11. The over-voltage comparator and shutdown circuit according to claim 8, wherein the shutdown circuit is configured to remove power from the switch mode regulator upon detection of an over-voltage condition.

12. The over-voltage comparator and shutdown circuit according to claim 8, wherein a power converter with the over-voltage comparator and shutdown circuit distinct from the switch mode regulator limits the power supply output in the presence of a single fault within the power converter.

13. The over-voltage comparator and shutdown circuit according to claim 8, wherein a power converter with over-voltage comparator and shutdown circuit distinct from the switch mode regulator limits the power supply output in the presence of two faults within the power converter.

* * * * *